Patented June 17, 1930

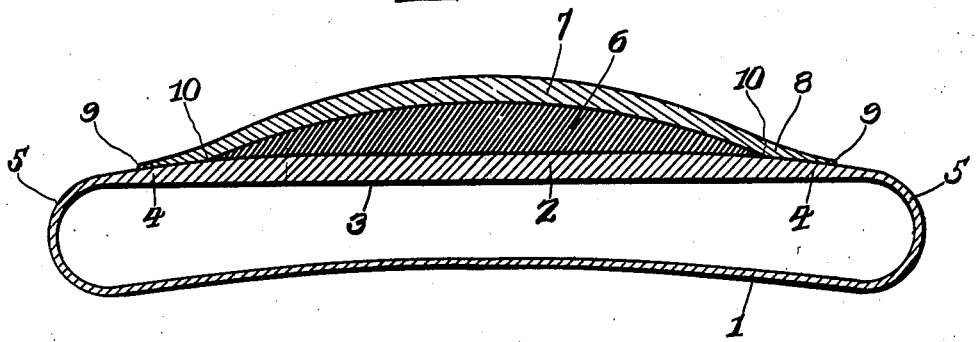
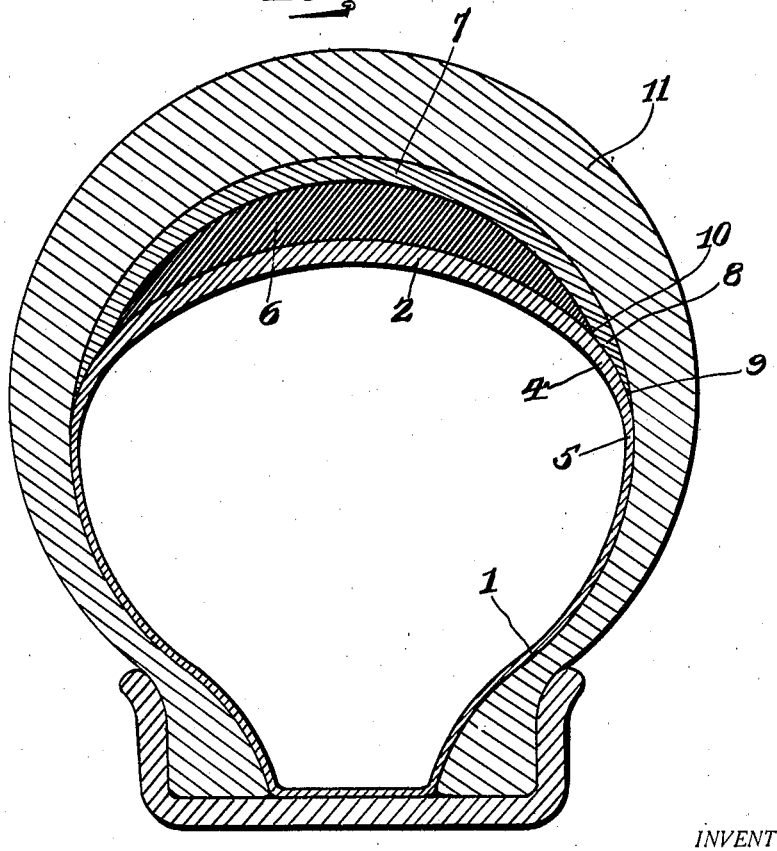

1,765,093

UNITED STATES PATENT OFFICE

ARTHUR W. OTT, OF DUBUQUE, IOWA

INNER TUBE FOR PNEUMATIC TIRES

Application filed February 21, 1930. Serial No. 430,408.

This invention relates to a puncture-proof inner tube of the type wherein the tread portion of the tube is formed with an inner wall and an outer wall having a body of healing compound interposed therebetween.

I am aware that tubes embodying the foregoing characteristics have been produced in many variations and with varying success. In some such tubes the inner and outer walls of the tread portion are of equal thickness with respect to each other and with respect to the wall of the main body portion of the tube. In others, either the inner or outer wall of the tread portion is of greater thickness than the other wall of the tread portion, and of a thickness either equal to or greater than the wall of the main body portion of the tube. In some of the tubes, the inner wall of the tread portion assumes a concave shape when the tube is deflated, and in others, a convex shape.

Some of the more common disadvantages of such tubes are the wrinkling of one of the walls of the tread portion, thereby subjecting the healing compound to an uneven physical pressure and disrupting the natural condition thereof; the splitting or rupturing of one of the walls of the tread portion, causing a partial dissipation of the healing compound and destroying the puncture-proof characteristic of the tube adjacent the split or rupture; and the failure of the healing compound to completely retain its healing characteristic due to the migration of sulphur thereinto when the tube is heated to vulcanize the same, or when excessive heat is generated in the normal use of the tube on the road.

I overcome the foregoing and other disadvantages by forming the inner and outer walls of the tread portion of equal thickness and of a greater thickness than the wall of the main body portion of the tube; by extending one of the thickened walls of the tread portion slightly beyond the other adjacent the side walls of the tube; by providing the inner wall of the tread portion with a flat inner face in cross section when the tube is deflated; and by reducing all portions of the tube stock to a non-vulcanizable state before the inner and outer walls of the tread portion are assembled with respect to the healing compound.

The primary object of this invention is to provide, in a manner as hereinafter set forth, a puncture self-healing inner tube which is capable of continuous satisfactory performance over long periods of time, whereby the normal life of tubes of such character may be materially increased.

A further object of the invention is to provide a tube of the character aforesaid including a body of healing compound in the tread portion of the tube, the latter being constructed in a manner to prevent any uneven physical pressure on the healing compound, and to conduce flexing of the tube during its use at the side wall portions thereof, thereby preventing any disturbance of the natural inert condition of the healing compound.

A further object of the invention is to provide an inner tube having a composite tread portion for automatically healing punctures which may be caused therein, with the elements of the tread portion so constructed and arranged relative to each other and to the remaining portion of the tube, that the likelihood of the splitting or rupturing of any part of the tread portion is eliminated, thereby materially increasing the life of the tube to perform its puncture healing function.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the same:—

Figure 1 is a section through a deflated inner tube in accordance with this invention.

Figure 2 is a section through the tube inflated and disposed within a tire.

Referring to the drawings in detail, the numeral 1 designates the main body portion of my improved inner tube within which the air or other fluid is to be confined. The air confining body is formed at its tread portion with a thickened wall 2, the inner face 3 of which is flat in cross section when the body is deflated. The marginal portions 4 of the thickened wall 2 gradually decrease in thickness in an outer direction and terminate adjacent the side walls 5 of the body.

Disposed on the outer face of the wall 2 is a healing compound 6 formed of a suitable tacky composition, said compound being shaped to gradually decrease in thickness from the center of the tread portion of the tube toward the side walls thereof and terminating at its side edges adjacent the marginal portions 4 of the wall 2.

Disposed over the healing compound 6 is a pad 7 which extends entirely around the healing compound circumferentially of the tube, and the side edges of which project materially beyond the side edges of the healing compound. Marginal portions 8 of the pad 7 gradually decrease in thickness in an outer direction and are fixedly secured to the marginal portions 4 of the wall 2, with the side edges 9 of the pad terminating inwardly of the lateral extremities of the marginal portions 4 of the wall 2. The points at which the wall 2 and pad 7 begin to decrease in thickness are indicated by the numeral 10. Between the marginal portions 8 the pad 7 is of uniform thickness throughout, such thickness being equal to the thickness of the wall 2 between the marginal portions 4. The pad 7 is formed of rubber incapable of further vulcanization after the same is positioned over the compound 6. Likewise the wall 2 is rendered incapable of further vulcanization before the compound 6 is applied thereto.

Owing to the equality in thickness of the pad 7 and wall 2, and to the greater thickness of such pad and wall with respect to the main wall portion of the body 1, the pad 7 and wall 2 are substantially resistant to stretch, therefore, when the tube is inflated within a tire, the stretching caused by the inflation will be confined to the main wall portion of the body, and the entire tread portion of the tube will move bodily into a position with the outer face of the pad 7 in contacting relation with the inner face of the tire. It is not to be understood that the pad 7 and wall 2 are incapable of being stretched if a sufficient force is applied thereto, but it is to be understood that a force sufficient to stretch the pad 7 and wall 2 so far exceeds the force required to stretch the main wall portion of the body 1 that the pad 7 and wall 2 will not stretch, and will not move relative to each other or to the healing compound, when the tube is inflated in a normal manner by the introduction of air into the interior of the body 1.

By forming the pad 7 and wall 2 of equal thickness, the compound 6 is provided with a confining wall of uniform thickness throughout, and without any point of such confining wall being weaker than any other point thereof. Consequently when the tread portion of the tube is flexed in the normal use of the same, the pad 7 and wall 2 flex uniformly and simultaneously, carrying the healing compound therewith. In such flexing, the wall 2 is moved toward its normal flat position when the tube is deflated, therefore there is no crowding of the material forming such wall, and substantially no relative movement thereof with respect to the pad 7 and healing compound 6. Owing to the gradually decreasing thickness of the tube wall between the tread portion and side walls thereof, formed by projecting the marginal portions 4 of the wall 2 beyond the side edges of the pad 7, there is a tendency for the tube to flex more readily at its side wall portions than at any other portion, with a consequent reduction in the degree of flex at the tread portion of the tube.

If desired, the non-stretch characteristic of the tread portion of the tube may be still further increased relative to the main wall of the body 1 by forming the wall 2 and pad 7 of a less pure tube stock than is employed in the construction of the main wall of the body 1, although this is not necessary. The pad 7 may be secured to the wall 2 in any suitable manner, so long as the pad and wall are entirely free of sulphur before being assembled with respect to the healing compound 6. It is important that the sulphur content of the pad 7 and wall 2 be entirely eliminated in order that there can be no vulcanization whatever of the healing compound due to road heat. Although the inherent characteristics of the healing compound 6 will cause the same to adhere to the outer face of the wall 2 and to the inner face of the pad 7, if desired a thin layer of cement may be applied to the inner and outer faces of the compound before such faces are brought into contact with the wall 2 and pad 7.

It is thought that the many advantages of an inner tube in accordance with this invention will be readily apparent, and although the preferred embodiment of the invention is as illustrated and described, it is to be understood that variations in the details of construction may be resorted to, so long as such variations fall within the scope of the invention as defined in the appended claims.

What I claim is:

1. An inner tube formed with a composite tread portion having an inner wall, an outer wall, and a healing compound interposed between said walls, said walls and the remaining wall portion of the tube being formed throughout of completely vulcanized rubber to prevent migration of sulphur into the healing compound by any heat to which the tube may be subjected, said walls being of equalized strength and having a combined strength materially greater than the remaining wall portion of the tube in order that said composite tread portion will be moved as a unit when air is introduced into the tube to inflate the same, said inner wall being flat transversely of the tube when the latter is deflated in order that the composite tread portion will move toward and through the normal position when flexed by the resistance of a road surface in the normal use of the tube to prevent any creasing or breaking of the inner wall by such flexing with attendant displacement of the healing compound.

2. An inner tube formed with a composite tread portion having an inner wall, an outer wall, and a healing compound interposed between said walls, said walls and the remaining wall portion of the tube being formed of like material, said walls being of substantial thickness and of equalized strength and having a combined strength materially greater than the remaining wall portion of the tube in order that said composite tread portion will be moved as a unit when air is introduced into the tube to inflate the same, said inner wall being flat transversely of the tube when the latter is deflated in order that the composite tread portion will assume substantially its normal position when flexed by the resistance of a road surface in the normal use of the tube to prevent any creasing or breaking of the inner wall by such flexing with attendant displacement of the healing compound.

3. An inner tube formed with a composite tread portion having an inner wall, an outer wall, and a healing compound interposed between said walls, said walls being of equal thickness and each being of materially greater thickness than the remaining wall portion of the tube in order that said composite tread portion will be moved as a unit when air is introduced into the tube to inflate the same, said tread portion walls and the remaining wall portion of the tube being of like material throughout, said inner wall being flat transversely of the tube when the latter is deflated in order that the composite tread portion will be caused to assume substantially its normal position when flexed by the resistance of a road surface in the normal use of the tube to prevent any creasing or breaking of the inner wall by such flexing with attendant displacement of the healing compound.

In testimony whereof, I affix my signature hereto.

ARTHUR W. OTT.